United States Patent [19]

Rowe et al.

[11] 4,350,789

[45] Sep. 21, 1982

[54] POLYESTER RESINS TOUGHENED WITH VINYL TERMINATED LIQUID POLYMERS

[75] Inventors: Eugene H. Rowe, Moab, Utah; Frank H. Howard, Akron, Ohio

[73] Assignee: The B. F. Goodrich Company, Akron, Ohio

[21] Appl. No.: 201,108

[22] Filed: Oct. 28, 1980

[51] Int. Cl.$^3$ .................... C08L 63/00; C08L 67/06
[52] U.S. Cl. ................................ 525/31; 525/438
[58] Field of Search .................. 525/43, 44, 46, 48, 525/10, 31, 38, 39, 40, 438

[56] References Cited

U.S. PATENT DOCUMENTS 3,733,370  5/1973  Thompson et al. .................. 525/44

*Primary Examiner*—J. Ziegler
*Attorney, Agent, or Firm*—George A. Kap

[57] ABSTRACT

Unsaturated polyester resins are rendered less brittle without deteriorating other properties thereof by mixing therewith 0.1 to 20 parts of a vinyl terminated reactive liquid polymer per 100 parts of the polyester resin.

10 Claims, No Drawings

POLYESTER RESINS TOUGHENED WITH VINYL TERMINATED LIQUID POLYMERS

BACKGROUND OF THE DISCLOSURE

Principal applications of thermosetting unsaturated polyester resins include surface coatings and molding compositions which usually contain reinforcements, such as glass fibers. Such molding compositions are especially suited for the production of reinforced plastics in the form of bulk molding compounds and sheet molding compounds. Boat hulls and automobile bodies are examples of how such molding compositions can be used.

Polyester resins are inherently brittle and it is desirable to reduce this property whenever polyester resins are used as a matrix material. It has been the industry practice to add a flexibilizer to the resin composition to reduce its brittleness. However, such practice generally results in a significant reduction in mechanical properties of the resulting products which is unacceptable for many product applications. It is, therefore, desirable to develop modified polyester resin compositions which are toughened for crack and/or impact resistance by incorporating a component which toughens without flexibilizing such compositions and without significantly contributing to the deterioration of thermal or mechanical properties thereof.

SUMMARY OF THE INVENTION

This invention relates to unsaturated vinyl ester resin compositions containing an effective amount of a vinyl terminated reactive liquid polymer (VTRLP) to improve toughness, i.e., crack and/or impact resistance, thereof, as measured, for instance, by the fracture surface energy or Gardner impact test. More specifically, this invention relates to vinyl ester resin compositions containing 0.1 to 20 parts of a VTRLP per 100 parts by weight of the vinyl ester resin to improve toughness thereof.

DETAILED DESCRIPTION OF THE INVENTION

Pursuant to this invention, toughened polyester resins are prepared by mixing an unsaturated polyester resin with a sufficient amount of a vinyl terminated reactive liquid polymer. Amount of the liquid polymer can vary from 0.1 to 20 parts by weight, preferably 1 to 10 parts, per 100 parts by weight of a polyester resin.

Polyesters useful in this invention are well known in the art. They include those derived by condensation of unsaturated dibasic acids or anhydrides containing 4 to 9 carbon atoms with polyols, including dihydroxy and trihydroxy compounds containing 2 to 12 carbon atoms. Specific examples of unsaturated dibasic acids include maleic, chloromaleic, fumaric, itaconic, mesaconic, phthalic, chlorophthalic, isophthalic, terephthalic, succinic, adipic, and sebacic acids.

Any of a variety of well known polyols including dihydroxy and trihydroxy, containing 4 to 9, preferably 4 to 6 carbon atoms per molecule can be used for condensation with the diacids to produce polyesters suitable for use in this invention. Preferred polyols, mentioned by way of example of a large number of suitable compounds, include ethylene glycol, diethylene glycol, propylene glycol, polypropylene glycol, glycerol, 1,X-butanediols, trimethylol propane, hexylene glycols, cyclohexane glycols, xylene glycols, pentaerythritol, di-(hydroxy propyl) ether of 2,2-di(4-hydroxyphenol)-propane, and the like. Also included are dihydric alcohols which conform to the following formula:

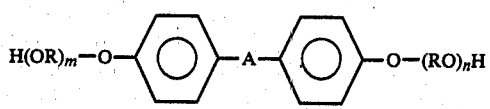

where R is an alkylene group of 2 to 3 carbon atoms, A is a 2-alkyl diene group of 3 to 4 carbon atoms, with m and n each being at least one and the sum of m and n is not over 6.

Of the unsaturated polyesters conforming to the definition herein, preferred unsaturated polyester resins are maleates and fumarates of symmetrical di(hydroxyalkyl)ethers of 2,2-di(4-hydroxyphenyl)propane which can be in halogenated form. Preferred polyesters also include divinyl esters of diglycidyl ether of bisphenol A and acrylic or methacrylic acid. Specific resins of this type are Dow's Derakane ® vinylester resins, whereas specific examples of preferred polyester resins of bisphenol A and fumaric acid are Atlas Chemical's Atlac ® resins, such as Atlac 711-05A vinylester resin which contains chemically bound halogen.

The polyester resins described herein may contain in the polymeric chain varying proportions of saturated or aromatic dibasic acids and anhydrides which are not subject to cross-linking. The particular non-cross-linking moieties and their proportions will depend upon the desired properties in the final product. Aromatic and saturated acids and anhydrides which are examplary of non-cross-linking moieties include phthalic anhydride, endomethylene-tetrahydrophthalic acid, tetrachlorophthalic acid, adipic acid, sebacic acid, succinic acid, and the like.

Commercial polyester resins for molding or laminating applications are sold as solutions thereof in a solvent comprising at least one polymerizable monomer which is copolymerizable with the polyester resin. The polymerizable monomer not only acts as a solvent but also copolymerizes with the unsaturated groups along the polyester chain. Polymerizable monomers which can be used in this invention include polymerizable vinylidene compounds having at least one terminal $CH_2 <$ group and containing 2 to 12 carbon atoms, preferably 3 to 10 carbon atoms. A wide variety of these compounds are known including both aliphatic and aromatic unsaturated hydrocarbons and hydrocarbon derivatives, such as esters, acids and nitriles. Examples of suitable polymerizable monomers are styrene, methyl styrene, acrylonitrile, methyl acrylate, methyl methacrylate, vinyl toluene, vinyl acetate, allyl esters of phthalic, adipic, maleic, malonic, and cyanuric acids, and mixtures of such monomers. Styrene and methyl styrene are particularly useful polymerizable monomers. Amount of the polymerizable monomer solvent relative to the polyester resin can be on the order of 40/60.

Vinyl terminated reactive liquid polymers suitable for purposes herein have reactive vinylidene ($CH_2=C<$) groups. These liquid polymers have a theoretical reactive vinylidene functionality of 2.0, i.e., one reactive vinylidene group at each end of the polymer molecule. However, the vinylidene-terminated polymers can be prepared from liquid polymers which have an average functionality of less than 2. Because of this, and also due to incomplete conversions, these polymers can have an average reactive vinylidene functionality as low as about 1.2 The liquid polymer reactants used to prepare the vinyl terminated (VT) polymers can also have additional carboxyl, hydroxyl, mercaptan, amine, or epoxy functional groups as pendant groups. When such a polymer reactant is employed, the VT polymers can have more than 2, and up to about 12 reactive vinylidene groups. Therefore, the VT polymers can have an average reactive vinylidene functionality of from 1.2 to about 12. More preferably, the VT polymers have an average reactive vinylidene functionality of from about 1.6 to about 4.

The liquid vinylidene-terminated polymers have a molecular weight of from about 1,000 to about 20,000 as measured using a Mechrolab Vapor Pressure Osmometer. The polymers are more conveniently described by their bulk viscosity. The polymers have a bulk viscosity at 27° C. of from about 500 to about 8,000,000 centipoises, using a Brookfield model LVT viscometer with spindle No. 7 at 0.5 to 100 rpm. More preferably, the polymers have a bulk viscosity from about 5,000 to about 2,000,000 centipoises.

The VT polymers are prepared by the reaction of (1) a liquid polymer having from about 1.5 to about 12 functional groups per molecule capable of reacting with an epoxy

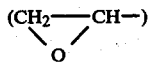

group, and (2) a compound containing both an epoxy group and a vinylidene group. Liquid polymer reactants having terminal functional groups capable of reacting with an epoxy group include (A) liquid carboxyl-terminated polymers, (B) liquid mercaptan-terminated polymers, (C) liquid hydroxyl-terminated polymers, (D) liquid amine-terminated polymers, and (E) liquid epoxy-terminated polymers. These polymers have molecular weights and bulk viscosities in the same range as described herein for the vinylidene-terminated polymers. The functional group, which can be carboxyl, hydroxyl, mercaptan, amine or epoxy, comprises from about 0.5 percent to about 10 percent by weight based upon the weight of the polymer. More preferably, the functional group comprises about 1 percent to about 5 percent by weight of the polymer.

The functionally terminated polymers have polymeric backbones comprising carbon-carbon linkages, polyether linkages, or polysulfide linkages. The polymers having carbon-carbon linkages contain polymerized units of a vinylidene monomer selected from (a) monoolefins containing 2 to about 8 carbon atoms such as ethylene, propylene, isobutylene, 1-butene, 1-pentene, 1-hexene, and the like; (b) dienes containing 4 to about 10 carbon atoms such as butadiene, isoprene, 2-isopropyl-1,3-butadiene, chloroprene, and the like; (c) vinyl aromatics such as styrene, α-methyl styrene, vinyl toluene, and the like; (d) vinyl nitriles such as acrylonitrile, methacrylonitrile, and the like; (e) vinyl and allyl esters such as vinyl acetate, vinyl propionate, allyl acetate, and the like; (f) vinyl and allyl ethers such as vinyl methyl ether, allyl methyl ether, and the like; (g) divinyls and diacrylates such as divinyl benzene, divinyl ether, diethylene glycol diacrylate, and the like; and (h) acrylates of the formula

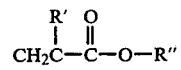

wherein R' is —H, —CH₃ or —C₂H₅, and R" is an alkyl radical containing 1 to 18 carbon atoms or an alkoxyalkyl, or alkylthioalkyl, or cyanoalkyl radical containing 2 to about 12 carbon atoms. Examples of such acrylates are ethyl acrylate, butyl acrylate, hexyl acrylate, 2-ethylhexyl acrylate, dodecyl acrylate, octadecyl acrylate, methoxyethyl acrylate, butoxyethyl acrylate, hexyl thioethyl acrylate, β-cyanoethyl acrylate, cyanooctyl acrylate, methyl methacrylate, octyl methacrylate, ethyl ethacrylate, and the like. Often, two or more types of polymerized monomeric units are contained in the polymeric backbone.

Examples of liquid carboxyl-terminated polymers are carboxyl-terminated polyethylene, polybutadiene, polyisoprene, poly(butadiene-acrylonitrile), poly(butadiene-styrene), poly(butadiene-acrylonitrile-acid), poly(ethyl acrylate), poly(ethyl acrylate-n-butyl acrylate), poly(n-butyl acrylate-acrylonitrile), poly(butyl acrylate-styrene), and the like. The polymers can be prepared by free radical polymerization using carboxyl-containing initiators and/or modifiers as disclosed in U.S. Pat. No. 3,285,949 and German Pat. No. 1,150,205, and polymers prepared by solution polymerization using lithium metal or organometallic compounds and post-treating the polymers to form carboxyl groups as disclosed in U.S. Pat. Nos. 3,135,716 and 3,431,235. Liquid carboxyl-terminated polymers as carboxyl-terminated polybutadiene, polybutadiene-acrylonitrile, and polyacrylate were found to be excellent reactants for the preparation of the novel polymers.

Examples of liquid mercaptan-terminated polymers are mercaptan-terminated polybutadiene, polyisoprene, poly(butadiene-acrylonitrile), poly(ethyl acrylate), poly(ethyl acrylate-n-butyl acrylate), poly(ethyl acrylate-n-butyl acrylate-glycidyl acrylate), and the like. The polymers can be prepared by free-radical polymerization of monomers in the presence of dixanthogen disulfide and then post-treated to form the mercaptan groups as disclosed in U.S. Pat. Nos. 3,449,301 and 3,580,830 and British Pat. No. 859,470. They can also be mercaptan-terminated polyethers as disclosed in Journal of Polymer Science, Vol. 12 (1968), Page 107; and mercaptan-terminated polyalkylene sulfides.

Examples of liquid hydroxyl-terminated polymers are hydroxyl-terminated polyethylene, polybutadiene, polyisoprene, poly(butadiene-acrylonitrile, poly(acrylates), and the like. The polymers can be prepared by post-reacting carboxyl-terminated polymers as disclosed in U.S. Pat. Nos. 3,551,471 and 3,551,472; by free-radical polymerization of monomers using hydroxyl containing initiators as in U.S. Pat. No. 2,844,632; and by-solution polymerization using lithium or organometallic catalysts and post-reacting the product to form the hydroxyl groups as disclosed in U.S. Pat. Nos. 3,135,716 and 3,431,235.

Examples of liquid amine-terminated polymers are the amine-terminated poly(2-methyl ethoxy) polymers and the glycol polyamines disclosed in U.S. Pat. No. 3,306,809.

Examples of liquid epoxy-terminated polymers are glycidyl ethers of polyhydric alcohols such as glycerol, pentaerithritol, polyvinyl alcohol, 1,3,5-trihydroxybenzene, and the like; the glycidyl ethers of polyhydric phenols such as bisphenol A resins and of phenol-formaldehyde products such as the Novolac resins; and other epoxies as disclosed in U.S. Pat. No. 3,310,601.

The liquid polymer reactants can contain more than one type of functional group. For example, the polymer can have terminal carboxyl groups and internal pendant epoxy groups derived from interpolymerized units of glycidyl acrylate monomer. Or, the polymer can contain terminal mercaptan groups and internal pendant carboxyl groups derived from interpolymerized units of acrylic acid.

The novel liquid vinyl terminated polymers are prepared in a process comprising the reaction of a liquid functionally-terminated polymer, as described above, with a compound containing both an epoxy and a vinyl group. These compounds have the formula

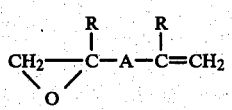

wherein R is hydrogen or an alkyl radical containing 1 to 4 carbon atoms, and A is a bivalent radical containing 1 to about 10 atoms selected from C, O, S and N. More preferably, the compound contains the following glycidyloxy structure,

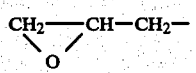

Examples of the more preferred compounds are isopropenyl glycidyl ether, allyl glycidyl ether, methallyl glycidyl ether, glycidyl acrylate, and glycidyl methacrylate. Even more preferred are glycidyl acrylate and glycidyl methacrylate.

The liquid vinyl terminated polymers have the structure

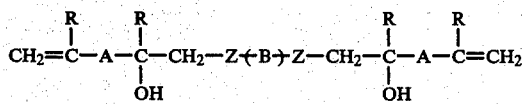

wherein B is a polymeric backbone of carbon-carbon, polyether, or polysulfide linkages; Z is selected from the group consisting of —O—, —S—, —NH—,

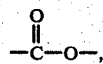

and —O—CH$_2$—CH$_2$—; A is a bivalent radical containing 1 to 10 carbon atoms of C, O, S or N; and R is hydrogen or an alkyl radical containing 1 to 4 carbon atoms. The radical Z is the remaining fragment of the hydroxyl group of the hydroxyl-terminated polymer yielding the —O—, the mercaptan group of the mercaptan-terminated polymer yielding —S—, the amine group of the amine-terminated polymer yielding the —NH—, the carboxyl group of the carboxyl-terminated polymer yielding the

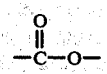

or the epoxy group of the epoxy-terminated polymer yielding the —O—CH$_2$—CH$_2$—. The radical A originates from the compound containing both the epoxy and the vinylidene group. More preferably, A is

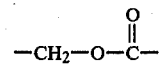

which is derived from the use of glycidyl acrylate or glycidyl methacrylate, —CH$_2$O—CH$_2$— which is derived from the use of allyl glycidyl ether or methallyl glycidyl ether, or —CH$_2$—O— which is derived from the use of isopropenyl glycidyl ether. The polymeric backbone B originates from the polymeric backbone of the functionally terminated polymer reactant.

The liquid carboxyl-terminated polymers were found to be excellent reactants for the reaction. Such polymers have an average functionality of from about 1.5 to about 12, and more preferably from about 1.8 to about 4. The average functionality can be determined by multiplying the molecular weight of the polymer by the equivalent parts per hundred of carboxyl groups. The molecular weight can be measured using a Mechrolab Vapor Pressure Osmometer. The equivalent parts per hundred of carboxyl groups is determined by measuring the weight percent of carboxyl groups in the polymer by titration of a polymer solution to a phenolphthalein end-point using alcoholic KOH and dividing the resultant figure by 45, the weight of a carboxyl group (—COOH). The liquid carboxyl-terminated polymers employed have a molecular weight ranging from about 1,000 to about 20,000 and a bulk viscosity from about 1,000 to about 8,000,000 centipoises. An example of such functionally-terminated liquid polymer is the group of poly(butadiene-acrylonitrile-acid) polymers that is a reaction product of 50 to 95% by weight butadiene, 10 to 35% by weight acrylonitrile and 1 to 5% by weight acrylic acid.

The reaction to make VT polymers can be conducted in bulk, preferably employing an excess of the epoxy-vinylidene compound. More preferably, the reaction is conducted in a solvent. The choice of solvent is influenced by the solubility of the liquid functionally-terminated polymer used. Examples of useful solvents are aliphatic hydrocarbons such as heptane, hexane, acetone, methylethyl ketone, isopropyl alcohol, t-butyl alcohol, and the like. Acetone was found to be an excellent solvent for a variety of liquid polymers.

The reaction temperature is from about 0° C. to about 200° C. A more preferred temperature range is from about 50° C. to about 150° C. Total reaction time varies as to the reaction temperature and to the use of a catalyst. A normal reaction time is from about 4 hours to about 24 hours. The reaction is preferably conducted in the absence of air or oxygen.

The reaction rate between the carboxyl group and the epoxy group can be accelerated by using a base as a catalyst. The base can be an inorganic base such as sodium hydroxide, potassium hydroxide, and metal alcoholates such as sodium ethoxide, potassium butoxide, and the like. More preferably, the base is a tertiary amine. The tertiary amine can be aliphatic, cyclic methyleneamines, or heterocyclic amines. Examples of these are trimethylamine, triethylamine, triisopropyl amine, dimethylbutyl amine, dimethylbenzyl amine, methyldiphenyl amine, triethanol amine, N-methyl piperidine, N-methyl morpholine, triethylenediamine, pyridine, 4,4'-dipyridyl propane, 2,4,6-tri(dimethylaminomethyl)phenol, and the like.

The base is used in a range from about 0.05 to about 2 parts by weight based on 100 parts by weight of the liquid functionally-terminated polymer reactant. More preferably, the base is used at a level from about 0.1 part to 1 part by weight.

The vinyl terminated polymers can be isolated by direct drying under reduced pressure or by coagulation. If a base catalyst is employed, typically an acid, such as hydrochloric acid, is added to neutralize the base prior to recovery. The solution can be coagulated using water, lower alkyl alcohol, or an alcohol/water solution. The polymer is then normally washed with water and dried under reduced pressure.

The liquid vinyl terminated polymers prepared from the carboxyl-terminated polymers have Z equal to

If glycidyl acrylate or glycidyl methacrylate is reacted with the carboxyl-terminated polymer the radical A is

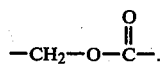

Of course, the polymeric backbone B is the same as in the carboxyl-terminated reactant.

The liquid polymers have highly reactive terminal vinyl groups. Therefore, preferably, they are admixed with an antioxidant to hinder premature air-oxidation. The antioxidant is used in a range from about 0.1 to about 5 parts by weight per 100 parts by weight of polymer. The antioxidants are typical antioxidants such as phenyl-$\beta$-naphthylamine, di-$\beta$-naphthyl-p-phenylenediamine, 2,6-di-t-butyl paracresol, 2,4,6-trihexyl phenol, 1,3,5-tris(3,5-di-t-butyl-4-hydroxybenzyl)isocyanurate, and other useful phenolic antioxidants disclosed in U.S. Pat. No. 3,157,517.

The vinyl terminated polymers are cured to solid elastomers using known curatives for unsaturated liquid polymers. The curatives include unsaturated rubber curatives such as sulfur, sulfur donors, tetramethylthiuram disulfide, tetramethylene guanidine, and the like. Because of the high activity of the vinylidene groups, the polymers can readily cure at room temperature to a dry surface using di- and polythiols and primary and secondary di- and polyamines.

Many other compounding ingredients can be used with the liquid polymers. Such ingredients include fillers such as clays, silicas, carbon blacks, resins, asbestos, and the like; plasticizers and extenders such as diisobutyl oleate, diisooctyl sebacate, dibenzyl phthalate, ASTM oils, glycerin, and the like; antioxidants and stabilizers; pigments such as $TiO_2$ iron oxide, chromium oxide, and the like; and tackifiers, waxes, fungicides, and the like.

The curatives and compounding ingredients can be admixed with the liquid vinyl terminated polymers using internal mixers such as Henschel mixers and extruders or using ink mill rolls, and using standard mixing techniques.

The liquid polymers can be poured into place, spread with a spatula or knife-edge, or forced into place using a caulk gun, or the like. The polymer cures quickly at room temperature, yielding an elastomer having a dry surface.

The liquid polymers which have performed admirably in the context of this invention are vinyl terminated reactive liquid polymers having a Brookfield viscosity at 27° C. of 900 to 1,500 and which are prepared by reacting acrylates and/or acrylonitrile with less than about 5% acrylic or methacrylic acid. Acrylonitrile content varies from about 5 to 35% by weight.

The modified unsaturated polyesters described herein can be fabricated into solid structures by admixing therewith an initiator or catalyst, usually a peroxide or hydroperoxide, and impregnating fibers or fabric therewith. The resulting mixture is placed in a mold or a form and heat and pressure are applied varying from 0.5 to 250 psi and 20° to 60° C. to cure the resin. Curing conditions depend on many factors, including the specific catalyst used. Suitable catalyst system comprises any of the well-known free-radical catalysts and, optionally, a catalyst promoter or accelerator. Examples of free-radical catalysts are peroxides and hydroperoxides such as benzoyl peroxide, cumene peroxide and hydroperoxide, lauroyl peroxide, t-butyl peroxide and hydroperoxide, methylethyl ketone peroxide, and the like; azobisisobutyronitrile, and t-butyl perbenzoate, and the like. Catalyst promoters or accelerators include metal salts such as cobalt, tin, and lead salts like cobalt naphthenate or octoate; and amines such as N,N-dimethylaniline, triethylamine, triethanolamine, and the like. The total weight of the free-radical catalyst system, whether or not a catalyst promoter is used, is from about 0.1 part to about 5 parts, more preferably from about 0.5 part to about 3 parts by weight based upon 100 parts by weight of the unsaturated polyester resin.

In order to evaluate the compositions of this invention for toughness and other properties, standard ASTM tests were used with nominal 6.35 mm thick samples. Other tests were used to measure shrinkage in the mold and Barcol hardness. Fracture toughness was evaluated by the double cantilever cleavage test for fracture surface energy and/or the Gardner dart impact test.

In the cleavage test, a crack is propagated along the median plane of a double cantilever specimen by tensile forces applied at the free ends. The 0.38 mm wide slot confines the crack so that it propagates through a specific volume in a stable manner. The dimensions of double cantilever test specimen are illustrated in the appendix of the article by L. J. Broutman and F. J. McGarry in *J. Appl. Polymer Science*, Vol. 9, p. 589 (1965). The fracture surface energy $\gamma$ can be calculated from the equation $\gamma = A/2w$, where A is the area under load-deflection curve, w is crack width, and 1 is crack length. To obtain fracture surface energy, the cleavage specimen is loaded at a constant cross head rate of 2.5 mm per minute using an Instron Testing machine. The load versus deflection curve is obtained using the strip chart recorder.

For the Gardner impact test, an instrument is used which comprises a base plate, a round-nosed steel rod impact weight, a slotted tube having inch-pound graduations in which the rod is lifted and dropped, and a bracket to hold the tube in a vertical position. Impact resistance is determined by subjecting either side of a sample panel to an impact of up to 320 inch-pounds, depending upon the weight dropped. The sample panel is placed over a 12.7 mm hole in the base plate; the steel rod weight is raised by lifting an attached pin until the pin coincides with the desired inch-pounds graduation mark on the slotted tube, and then dropped. The sample panel is examined for cracking or failure after each impact. The test used a 6.35 mm radius dart on a 6.35 mm thick sample panel. A two-pound weight was dropped from various ascending heights onto the ring supported sample until catastrophic failure occurred.

The following examples illustrate preparation of typical resins of this invention and superior mechanical properties thereof as reflected by fracture surface energy, impact and shrinkage tests which are designed to evaluate brittleness and other properties of such resins.

EXAMPLE 1

Resin samples were prepared by mixing at room temperature for 10 to 15 minutes Atlac® 711-05A polyester resin with VTBNX vinyl terminated reactive liquid polymer in amounts indicated in Table I, below. Atlac polyester resin 711-05A is a reaction product of bisphenol A and fumaric acid containing bound halogen, bromine. The polyester resin used herein was in a 50% styrene solution and amounts given in the table below are given in terms of 100% polyester resin. The VTBNX liquid polymer is a butadiene-acrylonitrile-acrylic acid reactive liquid polymer in 50% styrene solution. The reactive polymer itself has a Brookfield viscosity at 27° C. of 250,000±100,000 cps, number averge molecular weight of 2500, functionality of 2.3, and is composed of 17% acrylonitrile, 2.2% acrylic acid, and remainder being butadiene units. Certain of the other samples were prepared with a vinyl terminated epichlorohydrin reactive liquid polymer (VTE) which has a viscosity at 27° C. of 3,060,000 cps, number average molecular weight of 2210, and contains 0.75% acrylic acid.

To the mixed liquid ingredients were added 0.5 part cobalt naphthanate in the form of a 10% styrene solution with mixing for one-half minute, and thereafter, 2 parts methyl ethyl ketone peroxide with mixing for about one-half minute. The air was evacuated by applying vacuum of 30 inches of mercury for 10 to 15 minutes until bubbles dissipated.

The resulting liquid mix was poured into a vertical mold preheated at 60° C. to produce a 6.35×254×229 mm plaque which was cured for one hour at 60° C. and then for one hour at 120° C. before being cooled to room temperature. Specimens were cut to the prescribed size and subjected to the tests mentioned earlier. A control sample, i.e., Sample C, was also prepared in the same manner but without any reactive liquid polymer. Components of the modified and control polyester resins, and test results for the test and control specimens are given in Table I, below, where amounts stated are in parts by weight, unless otherwise specified:

TABLE I

| | Samples | | | | |
|---|---|---|---|---|---|
| | A | B | C | D | E |
| Polyester Resin | 100 | 100 | 100 | 100 | 100 |
| VTBNX Liquid Polymer | 4 | 8 | — | — | — |
| VTE Liquid Polymer | — | — | — | 8 | 4 |
| Co Naph Solution | 0.5 | 0.5 | 0.5 | 0.5 | 0.5 |
| MEK Peroxide | 2 | 2 | 2 | 2 | 2 |
| Barcol Hardness | 24 | 23 | 28 | 16 | 23 |
| Gardner Impact, in-lb | 12 | 19 | 10 | 20 | 10 |
| Fracture Surface Energy, in-lb/in$^2$ | 1.99 | 0.83 | 0.6 | 1.2 | 0.81 |
| Shrinkage, percent | 2¼ | 2¾ | 3¼ | 3 | 2¾ |

TABLE I-continued

| | Samples | | | | |
|---|---|---|---|---|---|
| | A | B | C | D | E |
| Particle Size, microns | 2 & 10 | 2 & 10 | * | 2 | 2 |

*single phase system

Samples A and B showed a two particle size population of the VTBNX liquid polymer in the vinyl ester resin. When Samples A and B were notched, extensive whitening occurred on the tensile side of the break and a shear band appeared at the mid-plane between tensile and compression layers. Whitening was an indication of crazing taking place in the samples. Both of these phenomena disappeared on heating the sample for about one-half hour at 120° C. This is the first time that such results were observed in toughening polyesters in various other ways. Samples D and E did not exhibit such phenomenon.

Crazing is a desirable property and VTBNX appears to be responsible for it. Although crazing is known in epoxy systems, it was never before observed in polyester systems. Crazing appears to contribute to improved fracture toughness by absorbing an impact force and dissipating it by formation of numerous tiny crack fissures. Since crazing disappears on heating, this is an indication of reversibility of this phenomeon. Any material that exhibits crazing is tougher and can absorb more energy. Surprisingly, crazing and shear band were observed only with VTBNX liquid polymer; VTE liquid polymer did not produce this phenomenon.

With respect to the presence of two particle size distribution of the liquid polymer, this phenomenon appears to reflect better impact and toughness properties than systems having essentially one particle distribution. It is surprising to note that the two-particle size distribution of the liquid polymer in the ester resin was observed only in connection with VTBNX liquid polymer and not the VTE liquid polymer.

Evaluation of the test results indicates greatly improved fracture surface energy which is an indication of resistance to crack formation and propagation, i.e., toughness. Whereas the control Sample C showed fracture surface energy of 0.6, Samples A and B, containing VTBNX liquid polymer, showed values of 1.99 and 0.83, respectively. Samples D and E, containing VTE liquid polymer, had fracture surface energy of 1.2 and 0.81, respectively, somewhat lower than Samples A and B with VTBNX liquid polymer. Gardner impact was also improved by the presence of liquid polymers with Sample D, containing 8 parts of the VTE liquid polymer showing a value of 20 in-lbs, or double for the control Sample C. Even shrinkage showed a significant improvement, the improvement appearing to be inversely proportional to the amount of the liquid polymer present in the samples, within the limits tested.

We claim:

1. Composition of matter comprising a reaction product of an unsaturated polyester resin and a vinyl terminated reactive liquid polymer, amount of said liquid polymer being sufficient to improve toughness in terms of fracture surface energy without flexibilizing said composition and without significantly deteriorating thermal or mechanical properties thereof, said liquid polymer is a reaction product of a functionally terminated reactive liquid polymer and an epoxy compound containing both an epoxy and a vinyl group.

2. Composition of claim 1 wherein said polyester resin is selected from linear unsaturated polyesters that are reaction products of polyhydric alcohols and carboxylic acids or their anhydrides, and said liquid polymer is used in amount of 0.1 to 20 parts per 100 parts of said polyester resin.

3. Composition of claim 2 wherein said polyhydric alcohols are selected from ethylene glycol, diethylene glycol, propylene glycol, glycerol 1,X-butane diols, trimethylol propane, hexylene glycols, cyclohexane glycols, xylene glycols, pentaerythrytol, di-(hydroxypropyl)ether of 2,2-di(4-hydroxyphenol)propane, alcohols conforming to the formula

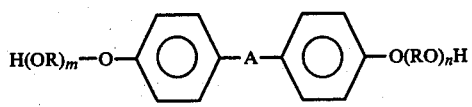

where R is an alkylene group of 2 to 3 carbon atoms, A is a diene group of 3 to 4 carbon atoms, and m and n each being at least one with the sum of m and n not being over 6, and mixtures of said polyhydric alcohols; said carboxylic acids are selected from maleic, fumaric, itaconic, mesaconic, tetrahydro phthalic, phthalic, chlorinated phthalic, isophthalic, succinic, adipic, sebacic, terephthalic, and mixtures of such acids.

4. Composition of claim 2 wherein said polyester resin is selected from halogenated and unhalogenated maleates and fumarates of symmetrical di(hydroxyalkyl)ethers of 2,2-di(4-hydroxyphenyl)propane, and divinyl esters of diglycidyl ether of Bisphenol A and acrylic or methacrylic acid.

5. Composition of matter of claim 4 wherein said liquid polymer comprises a polymeric reaction product of 50 to 95 weight percent butadiene, 10 to 35 weight percent acrylonitrile, and 1 to 5 weight percent acrylic acid, together with a compound defined by the following structure:

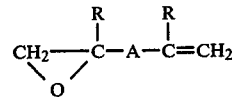

where each R is independently selected from hydrogen and alkyl radicals containing 1 to 4 carbon atoms and A is selected from bivalent radicals containing 1 to 10 atoms selected from the group consisting of C, O, S and N.

6. Composition of claim 5 wherein said liquid polymer contains 15 to 30 percent acrylonitrile and amount of said liquid polymer in said composition being 1 to 10 parts per 100 parts of said polyester resin.

7. Composition of claim 4 wherein said vinyl terminated reactive liquid polymer is selected from vinyl terminated butadiene-acrylonitrile, butadiene-acrylonitrile-acrylic acid, and vinyl terminated epichlorohydrin liquid polymers, said composition comprising a reaction product of said polyester resin in a polymerizable vinylidene compound and said vinyl terminated liquid polymer reaction product, said vinylidene compound containing a terminal $CH_2<$ group.

8. Composition of claim 4 wherein said vinyl terminated reactive liquid polymer is selected from vinyl terminated butadiene-acrylonitrile and vinyl terminated-butadiene-acrylonitrile-acrylic acid liquid polymers having a two particle size distribution in said polyester resin and shear bond.

9. Composition of claim 2 wherein amount of said vinyl liquid polymer is 1 to 10 parts per 100 parts of said polyester resin; said vinyl liquid polymer is a reaction product of said epoxy compound containing both an epoxy and vinyl group and a functionally terminated reactive liquid polymer of 50 to 95% by weight butadiene, 10 to 35% by weight acrylonitrile and 1 to 5% by weight of acrylic acid; said epoxy compound being glycidyl acrylates; said composition exhibiting crazing or shear band when notched.

10. Composition of claim 7 wherein amount of said vinyl liquid polymer is 1 to 10 parts per 100 parts of said polyester resin; said vinyl liquid polymer is a reaction product of said epoxy compound containing both an epoxy and vinyl group and a functionally terminated reactive liquid polymer of 50 to 95% by weight butadiene, 10 to 35% by weight acrylonitrile and 1 to 5% by weight of acrylic acid; said composition exhibiting a two particle size distribution.

* * * * *